C. G. WEATHERLY.
COMBINED FOLDING DOOR STEP AND SEAT FOR CARS.
APPLICATION FILED JAN. 5, 1915.
1,140,641.
Patented May 25, 1915.
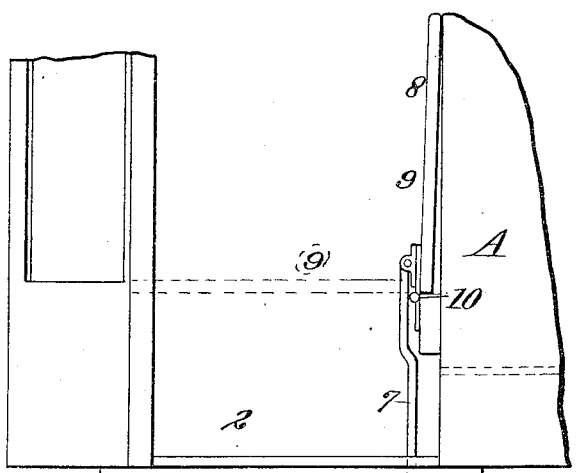
Fig. 1.
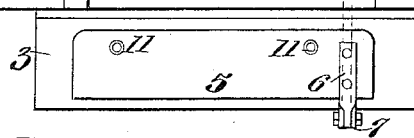
Fig. 2. Fig. 3.
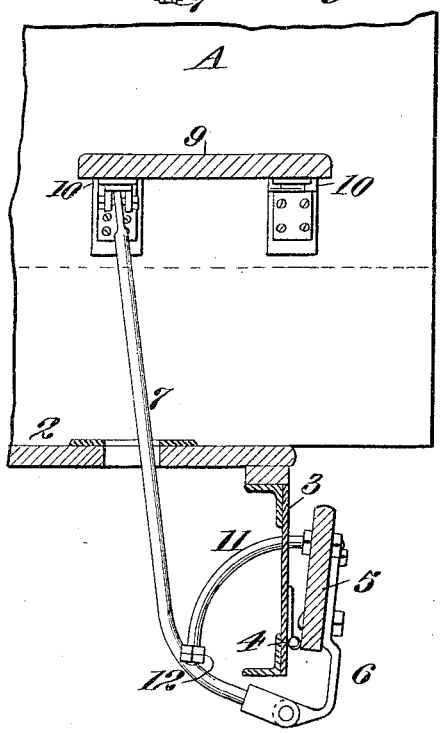
WITNESSES:
Charles Pickles
Frances V. Cole
INVENTOR
Charles G. Weatherly
BY G. H. Strong.
ATTORNEY

UNITED STATES PATENT OFFICE.

CHARLES G. WEATHERLY, OF SAN FRANCISCO, CALIFORNIA.

COMBINED FOLDING DOOR-STEP AND SEAT FOR CARS.

1,140,641.  Specification of Letters Patent.  Patented May 25, 1915.

Application filed January 5, 1915. Serial No. 592.

*To all whom it may concern:*

Be it known that I, CHARLES G. WEATHERLY, a citizen of the United States, residing in the city and county of San Francisco and State of California, have invented new and useful Improvements in Combined Folding Door-Steps and Seats for Cars, of which the following is a specification.

This invention relates to railway car structure, and especially to improvements in pay-as-you-enter cars.

It is an object of this invention to provide a novel combination of folding car step and folding seat with means so connecting them that when the step is folded down into serviceable position the seat is folded up out of usable position, and vice versa.

Another object is to provide an operating means for the step which serves the further function of a seat.

Under present traffic conditions it is customary to keep the doors or gates of a car near the parallel tracks closed to avoid accidents. By my invention a step mounted below the closed door is held folded against use. I provide a means for operating the step and which means also forms a seat inside the closed door.

The invention consists of the parts and the combination and construction of parts, as hereinafter more fully described and claimed, having reference to the accompanying drawings, in which—

Figure 1 shows a portion of a platform of a car with the device applied. Fig. 2 is a detail view showing the step lowered and the seat raised. Fig. 3 is a detail showing the step raised and the seat lowered.

2 indicates the platform of a car A, and on which is a riser 3. Hinged to the riser at 4 is a step 5. It is desired to raise and lower this step by suitable means from a position on the car platform. To that end there is connected to the step an arm 6 operable by a link 7 extending up through a hole in the platform and connected to a lever 8 in the form of a flat bench 9 forming, when swung about its hinge 10, a seat. The seat is preferably located to lie along the inner side of the closed door of the car.

The operation of the device is as follows: To fold the step up from usable position Fig. 2, the bench or seat 9 is swung down to horizontal position Fig. 3, during which movement the link 7 acts to swing the step up about its hinge 4. Conversely, lifting the seat 9 rocks the step down.

To render the step firm and capable of supporting heavy loads, one or more curved braces 11 are attached thereto and passed through respective apertures in the riser. The braces 11 are provided with nuts 12 adjustable to engage and bear against the back of the riser when the step is down.

Having thus described my invention, what I claim and desire to secure by Letters Patent is—

1. In a railway car, a step hingedly connected to the platform thereof, an arm fixed to the step, a seat hingedly connected to the car, and a rigid link having its upper end pivotally connected to the seat, and its lower end pivotally connected to the inner end of the arm, whereby when the seat is swung to its operative position the step is folded, and conversely when the seat is in its inoperative position the step is in operative position.

2. In a railway car, a riser supported by the platform thereof, a step hingedly connected to the riser, an arm fixed to the step, a seat hingedly connected to the car, a single link pivotally connecting the seat and step, curved rods rigidly connected to the step and slidably connected to the riser, and adjustable stops carried by the free ends of the rods for engaging the rear face of the riser.

3. In a railway car, a step hingedly connected to the car platform, a seat hingedly connected to the car, and a link directly and pivotally connecting the seat and step and being adapted for sliding and swinging movement with respect to the platform when the seat is operated to fold or unfold the step.

4. In a railway car having a side doorway, a seat hinged at one end to the doorway and adapted to extend across said doorway, a step hingedly connected to the car way below the doorway so as to longitudinally fold up toward the doorway, and rigid means pivotally connected to the seat and to the step at its ends for actuating the seat and step in unison.

5. In a railway car having a side doorway, a seat hinged at one end to the doorway and adapted to extend across said doorway, a step hingedly connected to the car way below the doorway so as to longitudinally fold up toward the doorway, and a rigid link pivoted at its upper end to the seat and having its lower end curved and pivoted to the step.

6. In a railway car, a hinged seat, a hinged step, and unitary means pivoted to the seat and step and bodily swingable for effecting movement of the seat and step in unison.

In testimony whereof I have hereunto set my hand in the presence of two subscribing witnesses.

CHARLES G. WEATHERLY.

Witnesses:
 JOHN H. HERRING,
 G. S. DONELIN.

Copies of this patent may be obtained for five cents each, by addressing the "Commissioner of Patents, Washington, D. C."